O. C. SCHLENKER.
COMBINED TIRE CARRIER AND RIM SPREADER AND CONSTRICTOR.
APPLICATION FILED AUG. 30, 1920.
1,393,319.
Patented Oct. 11, 1921.
2 SHEETS—SHEET 1.
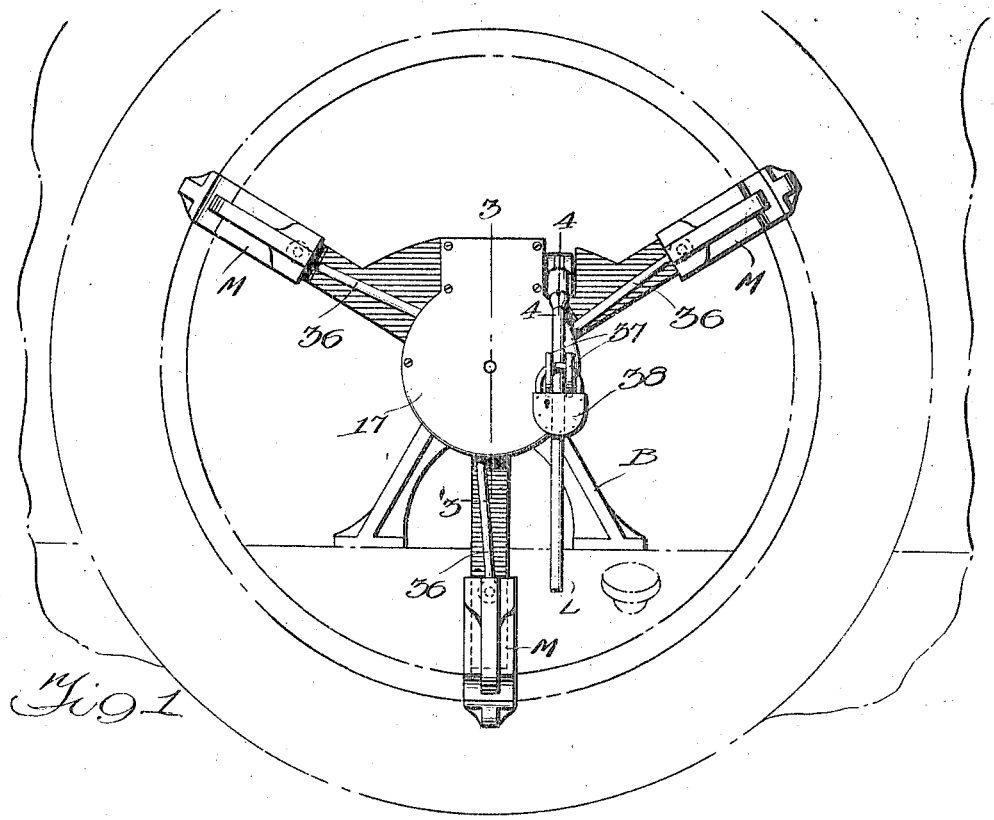
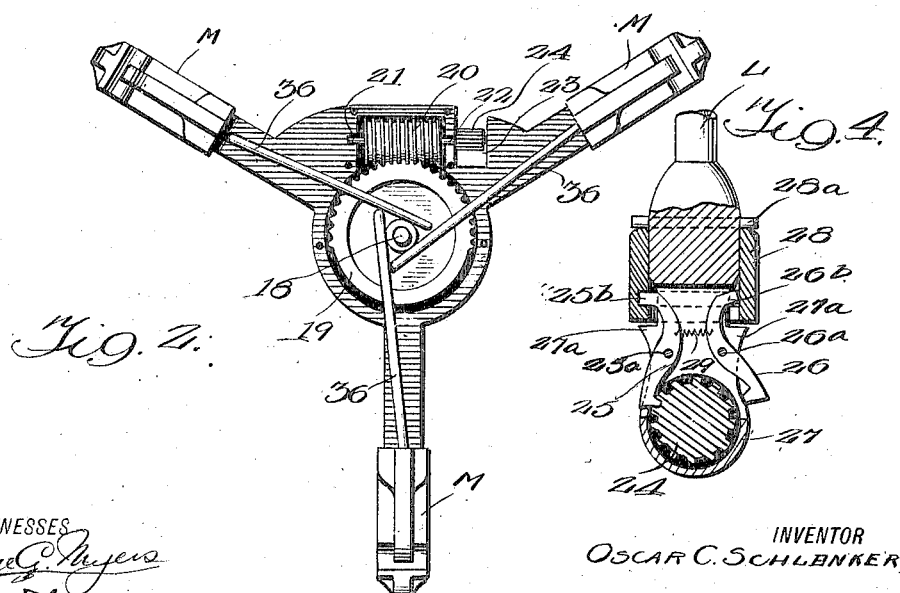
WITNESSES
INVENTOR
OSCAR C. SCHLENKER,
BY
ATTORNEYS

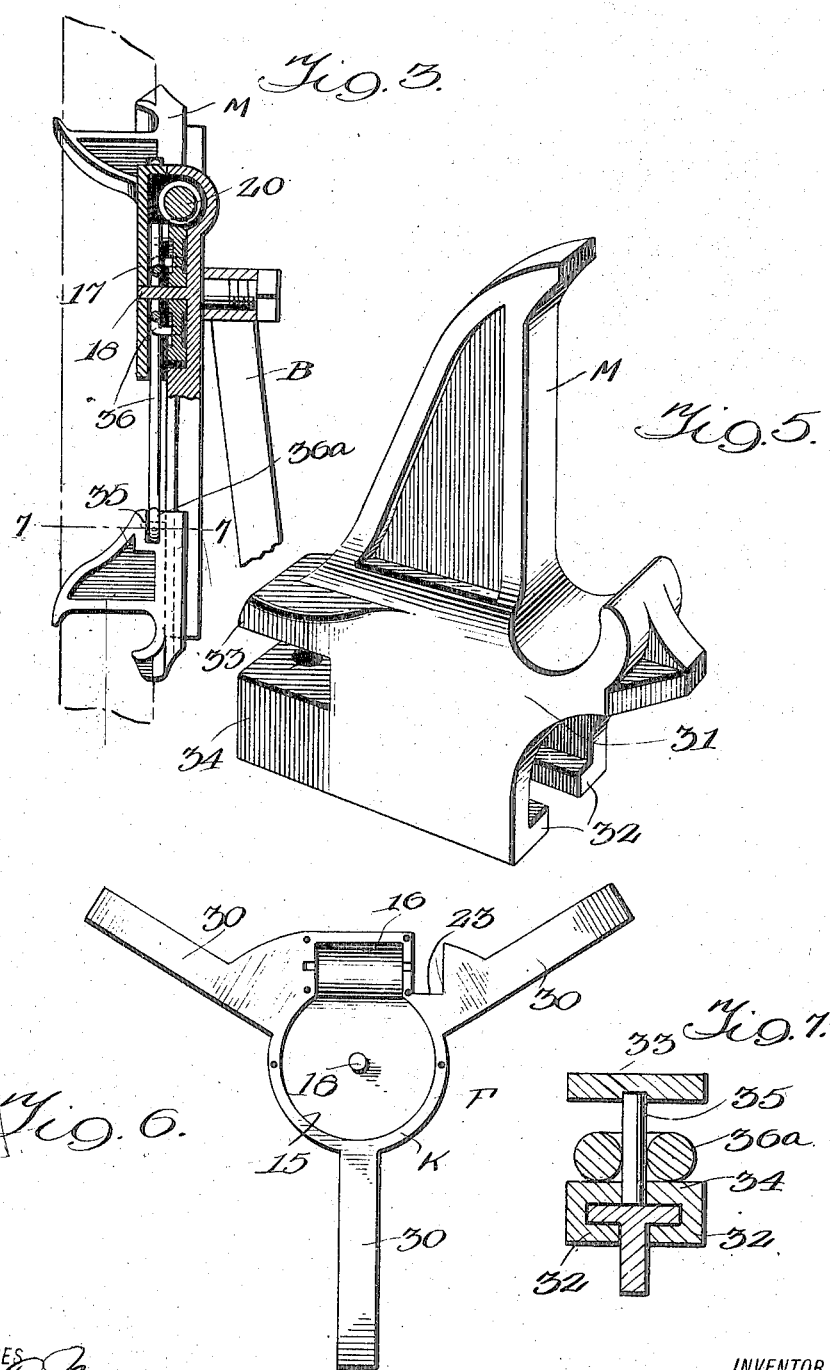

UNITED STATES PATENT OFFICE.

OSCAR CHARLES SCHLENKER, OF HEREFORD, TEXAS.

COMBINED TIRE-CARRIER AND RIM SPREADER AND CONSTRICTOR.

1,393,319.   Specification of Letters Patent.   Patented Oct. 11, 1921.

Application filed August 30, 1920. Serial No. 406,781.

*To all whom it may concern:*

Be it known that I, OSCAR CHARLES SCHLENKER, a citizen of the United States, and a resident of Hereford, in the county of Deaf Smith and State of Texas, have invented certain new and useful Improvements in Combined Tire-Carriers and Rim Spreaders and Constrictors, of which the following is a specification.

My invention relates to tire carriers and rim spreaders and constrictors, and the purpose of my invention is the provision of a device adapted to be attached preferably to the rear of a motor vehicle which is capable of performing the double function of carrying a spare tire and rim and spreading and constricting the rim to effect the application and removal of the tire to or from the rim.

I will describe one form of device embodying my invention and will then point out the novel features thereof in claims.

In the accompanying drawings:

Figure 1 is a view showing in front elevation one form of device embodying my invention in applied position upon the rear of a motor vehicle.

Fig. 2 is a detailed view of the device with the cover plate of the casing removed.

Fig. 3 is a vertical sectional view taken on the line 3—3 of Fig. 1.

Fig. 4 is an enlarged framentary sectional view taken on the line 4—4 of Fig. 1.

Fig. 5 is an enlarged detail view of one of the rim embracing members.

Fig. 6 is a view showing in rear elevation the frame of the device.

Fig. 7 is a transverse sectional view taken on the line 7—7 of Fig. 3.

Similar reference characters refer to similar parts in each of the several views.

Referring specifically to the drawings and particularly to Fig. 6, F designates generally a metallic frame comprising a casing K including a circular portion 15 and an elongated portion 16, both of which portions are adapted to be closed by a cover plate 17, as shown in Figs. 1 and 3. Formed axially within the circular portion 15 is a stub axle 18 upon which is journaled a cog wheel 19 which, as shown in Fig. 2, is provided with cogs which extend substantially half of the circumference of the wheel. Meshing with the cog wheel 19 is a worm 20 provided with stub axles 21 and 22 which are journaled in suitable openings formed in the frame. The stub axle 22 extends into a recess 23 formed in the frame where it is provided with a ratchet wheel 24 that is adapted to be engaged by either of a pair of pawls 25 and 26 for effecting rotation of the worm 20 in one direction or the other.

As shown in Fig. 4, the pawls 25 and 26 are fulcrumed upon pins $25^a$ and $26^a$, respectively, fitted within one end of an actuating lever L. The toothed ends of the pawls 25 and 26 are movable through suitable slots formed in a housing 27 which surrounds the ratchet wheel 24 and is preferably formed integral with the adjacent end of the lever L. The opposite ends of the pawls 25 and 26 are formed with heads $25^b$ and $26^b$ which work in a circular groove formed on the inner wall of a tubular sleeve 28, such groove varying in depth in such a manner that when the sleeve is rotated in one direction or the other one pawl or the other will be moved to engaging or disengaging position. A coiled spring 29 is connected to the pawls 25 and 26 at one side of their fulcrum points so as to insure the proper movement of the pawls, as will be understood. The sleeve 28 is locked against longitudinal displacement on the lever by means of shoulders $27^a$ formed on the housing 27 and a pin $28^a$ which extends through the enlarged end of the lever L.

As shown in Fig. 6, the frame F also includes a pluralitiy of arms 30 which extend radially from the casing K, each arm being of T-shape in cross section as clearly shown in Fig. 7. In the present instance I have shown three of such arms but it is to be understood that any number of arms may be provided without departing from the spirit of the invention. Mounted for longitudinal sliding movement upon each of the arms 30 is a member M that is adapted to embrace a tire rim so as to move inwardly with the rim when it is being constricted and outwardly of the same when it is being expanded. As illustrated to advantage in Fig. 5, each rim embracing member comprises a body portion 31 formed at its outer edge to accommodate and securely grip a rim of conventional form. At the lower side of the body portion 31, companion flanges 32 of L-shaped contour are provided which are adapted to slidably receive therebetween the corresponding arm 30 and to thus support the member as a unit for sliding movement upon the arm. The rear or inner end of the body 31 is slotted for a short distance to provide a pair of companion lips 33 and 34. The lip 33 is recessed on its under side as is shown in Fig. 7 while the lip 34 is provided with an opening. Extending through the opening of the lip 34 and into the recess of the lip 33 is a pin 35, such pin being adapted to be embraced by the ringed end 36ª of a rod 36 as clearly shown in Fig. 7.

As shown in Figs. 1 and 2, each rim embracing member is provided with a rod 36, the inner end of the rod being bent at right angles and fitted within a suitable opening formed at a point eccentrically of the axis of the cog wheel 19. By this arrangement longitudinal movement of the several rods 36 is simultaneously effected when the gear 19 is rotated, such movement in turn effecting the sliding of the several rim embracing members M longitudinally upon the arms 30.

In practice, the device is preferably applied to the rear of a motor vehicle in the manner shown in Fig. 1 wherein it will be seen that the frame F is rigidly supported upon the vehicle by means of a conventional form of bracket B. The manner in which the bracket is connected to the frame is clearly shown in Fig. 3, although it is to be understood that any form of bracket or any manner of connecting the same can be employed to rigidly support the device in position upon the vehicle. A device so applied normally functions as a tire carrier for a spare tire and rim of a motor vehicle, the rim reposing within and being embraced by the several members M so as to rigidly support the tire and rim upon the vehicle. When it is desired to effect the removal or application of a tire to or from the rim, the device is operated in the following manner: By imparting a rocking movement to the lever L one of the pawls 25 or 26 is caused to engage the ratchet wheel 24 so as to effect rotation of the worm 20 in one direction. As the worm 20 meshes with the cog wheel 19 it will be clear that a rotation of the latter in one direction is effected. Assuming that the cog wheel 19 is rotated in a clockwise direction, an inward longitudinal movement of the several rods 36 is effected to cause the several rim embracing members to move inwardly upon the arms 30 thereby effecting a constriction of the rim in a manner which will be well understood. With the rim in this constricted position, the removal of the tire therefrom can be readily effected.

When it is desired to spread the rim to its normal diameter after the application of a tire has been effected, the sleeve 28 is rotated to cause that pawl which previously engaged the ratchet wheel 24 to move to disengaging position and to cause the other pawl to move into engaging position with respect to the ratchet wheel. With the pawls occupying these positions, it will be clear that upon imparting rocking movement to the lever L, reverse rotation of the worm 20 is effected to cause the cog wheel 19 to move in a counter-clockwise direction thereby moving the rods 36 outwardly so that the members M are likewise moved outwardly to spread the rim to its normal diameter.

As will be manifest from a consideration of Fig. 1, it will be clear that both the constricting and spreading of the rim can be readily effected with the device in applied position upon a motor vehicle, and that when the device is not functioning as a rim spreader and constrictor it functions as a tire carrier for supporting the spare tire and rim upon the motor vehicle.

In order to prevent tampering with the device I provide means for locking the lever L against movement, such means in the present instance comprising a pair of keepers 37 formed integral with the cover plate 17 and spaced apart to receive the lever L. The lever is locked in position between the keepers by means of a conventional form of padlock 38 in the manner shown in Fig. 1. With the lever locked in this position, it will be clear that movement of the mechanism for actuating the rim embracing members M is prevented so that the latter are maintained in their adjusted positions to securely hold and lock the rim and tire upon the device.

Although I have herein shown and described only one form of device embodying my invention, it is to be understood that various changes and modifications may be made herein without departing from the spirit of the invention, and the spirit and scope of the appended claims.

What I claim is:

1. A device of the character described comprising, a casing, arms extending radially from the casing, rim embracing members slidable on the arms, a cog wheel rotatable within the casing, rods connected eccentrically to the cog wheel and pivotally connected to said members, a worm meshing with the cog wheel and journaled in the casing, a ratchet wheel rotatable with the worm, an actuating lever pivotally mounted on the ratchet wheel, pawls carried by the lever and engageable with the ratchet wheel, means for moving either of said pawls to engaging or disengaging position with respect to the ratchet wheel, and means for locking said lever to said casing.

2. A device of the class described comprising, a plurality of radially extending arms rigidly connected to each other, rim embracing members slidable on the arms and each including companion flanges slidably engaging the respective arms, companion lips one of which engages the corresponding arm, a pin extending through the arm-engaging lip and into the other lip, a rod pivotally connected to said pin between said lips, and means for simultaneously reciprocating all of the rods to move the members longitudinally of the arms.

3. A device of the class described comprising, a plurality of radially extending arms rigidly connected to each other, rim embracing members slidably on the arm and each including companion flanges slidably engaging the respective arms, companion lips one of which engages the corresponding arm, a pin extending through the arm-engaging lip and into the other lip, a rod pivotally connected to said pin between said lips, and means for simultaneously reciprocating all of the rods to move the members longitudinally of the arms, comprising, a gear to which said rods are eccentrically connected, a worm meshing with the gear, and pawl and ratchet mechanism for actuating the worm.

OSCAR CHARLES SCHLENKER.